(12) United States Patent
Gopalakrishnan et al.

(10) Patent No.: US 8,714,117 B2
(45) Date of Patent: May 6, 2014

(54) FREE PISTON LINEAR ALTERNATOR UTILIZING OPPOSED PISTONS WITH SPRING RETURN

(75) Inventors: Venkatesh Gopalakrishnan, Troy, MI (US); Paul M. Najt, Bloomfield Hills, MI (US); Russell P. Durrett, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 103 days.

(21) Appl. No.: 13/277,299

(22) Filed: Oct. 20, 2011

(65) Prior Publication Data
US 2012/0112467 A1 May 10, 2012

Related U.S. Application Data

(60) Provisional application No. 61/410,338, filed on Nov. 4, 2010.

(51) Int. Cl.
*F02B 71/04* (2006.01)

(52) U.S. Cl.
USPC .......... 123/46 E; 123/46 R; 290/1 A; 290/1 R

(58) Field of Classification Search
USPC ....... 123/3, 46 R, 46 A, 46 E; 290/1 A, 1 E, 5
See application file for complete search history.

(56) References Cited

U.S. PATENT DOCUMENTS

| 2,355,924 | A | | 8/1944 | Pescara | |
| 2,494,573 | A | * | 1/1950 | Mueller, Jr. | 123/46 R |
| 3,234,395 | A | * | 2/1966 | Colgate | 290/1 R |
| 4,350,012 | A | * | 9/1982 | Folsom et al. | 60/520 |
| 4,369,021 | A | * | 1/1983 | Heintz | 417/364 |
| 5,036,667 | A | * | 8/1991 | Thatcher | 60/595 |
| 6,532,916 | B2 | * | 3/2003 | Kerrebrock | 123/46 E |
| 7,258,085 | B2 | * | 8/2007 | Niiyama et al. | 123/46 R |
| 7,318,506 | B1 | * | 1/2008 | Meic et al. | 290/1 A |
| 7,845,317 | B2 | * | 12/2010 | Max et al. | 123/46 E |
| 2005/0109295 | A1 | * | 5/2005 | Kaneko et al. | 123/46 E |
| 2005/0284427 | A1 | * | 12/2005 | Barth | 123/46 R |
| 2006/0196456 | A1 | * | 9/2006 | Hallenbeck | 123/47 A |
| 2008/0271711 | A1 | * | 11/2008 | Cheeseman | 123/46 E |

OTHER PUBLICATIONS

U.S. Appl. No. 13/277,308, not pub'd, Durrett et al.
U.S. Appl. No. 13/277,321, not pub'd, Durrett et al.

* cited by examiner

*Primary Examiner* — Noah Kamen
*Assistant Examiner* — Long T Tran

(57) ABSTRACT

A free piston linear alternator includes a cylinder having a pair of outer chambers, a pair of opposed pistons and a combustion chamber disposed between the opposed pistons. Each outer chamber is disposed between respective ones of the pistons and a respective outer end of the cylinder. The pistons are axially opposed from each other and independently generate electric current when each of the pistons linearly translate. Each of a pair of return members is disposed within a respective one of the outer chambers, and each of the return members is configured to return respective ones of the pistons to a respective first position from a respective second position after combustion.

16 Claims, 2 Drawing Sheets

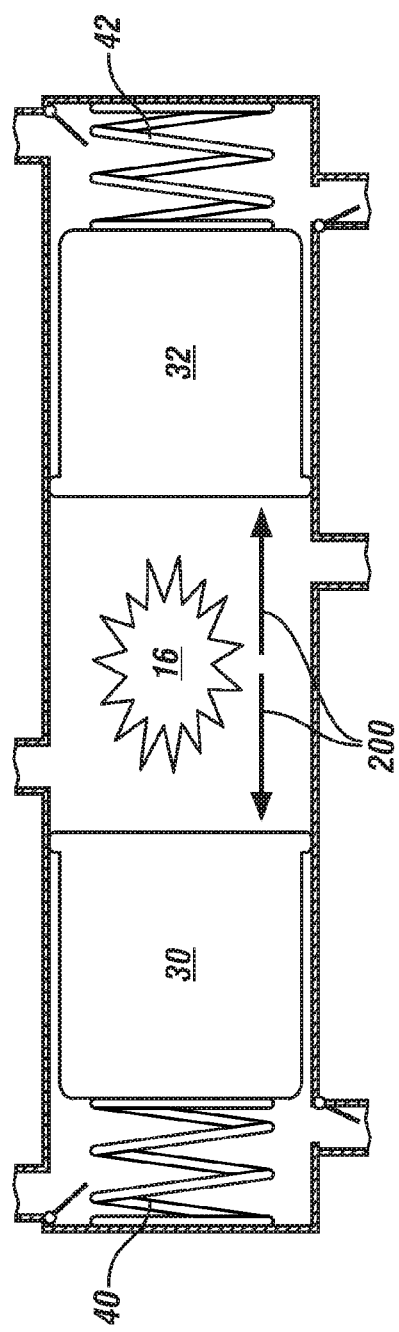
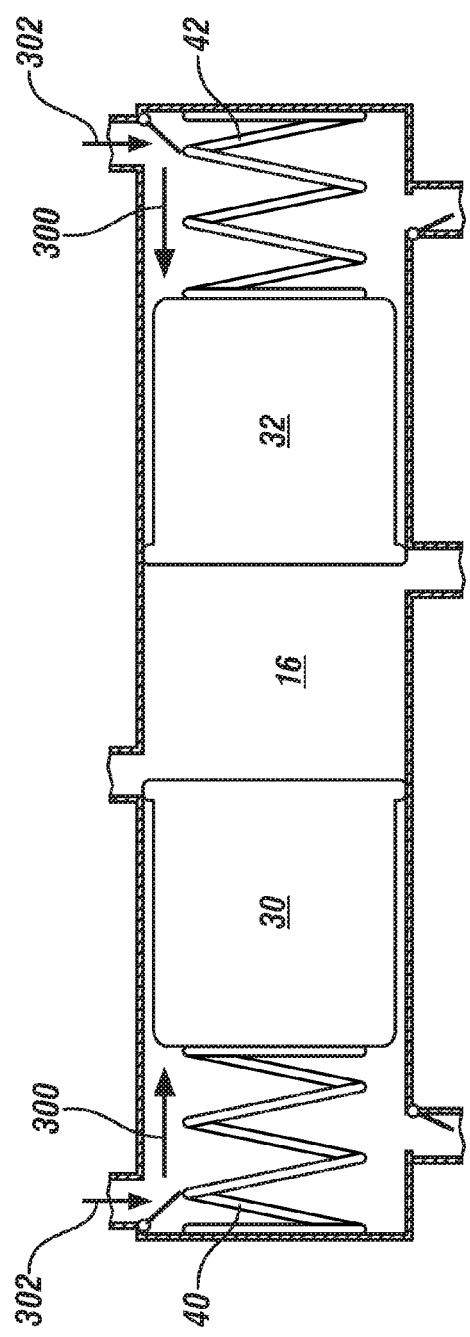

# FREE PISTON LINEAR ALTERNATOR UTILIZING OPPOSED PISTONS WITH SPRING RETURN

CROSS REFERENCE TO RELATED APPLICATIONS

This application claims the benefit of U.S. Provisional Application No. 60/410,338, filed on Nov. 4, 2010, which is incorporated herein by reference.

TECHNICAL FIELD

This disclosure is related to linear alternators utilizing opposed free pistons.

BACKGROUND

The statements in this section merely provide background information related to the present disclosure. Accordingly, such statements are not intended to constitute an admission of prior art.

An alternator is a device that translates a mechanical input into an electrical current. It is known, for example, to utilize a belt driven shaft to provide an input to the alternator. Alternators utilize induction to generate electricity. It is known, for example, to generate electric current utilizing relative motion between permanent magnets and windings (i.e., coils) of electrically conductive wire to generate current. Different numbers of configurations of magnets and windings are utilized to different effect upon the generated current.

An exemplary linear alternator is a device that includes a stationary cylinder and a translating piston within the cylinder. By positioning a magnet or magnets upon one of a wall of the cylinder and the piston and the windings upon the other of the cylinder wall and the piston, linear translation of the pistons creates induction and a resulting flow of current from the windings.

An opposed piston engine includes a combustion chamber in a center of the device and disposed between two pistons. As combustion occurs within the combustion chamber, the pistons are driven outward. The pistons are subsequently returned toward the center of the device in preparation for the next combustion event. Exemplary embodiments of an opposed piston engine include free piston engines not having a crankshaft attached to the pistons.

SUMMARY

A free piston linear alternator includes a cylinder having a pair of outer chambers, a pair of opposed pistons and a combustion chamber disposed between the opposed pistons. Each outer chamber is disposed between respective ones of the pistons and a respective outer end of the cylinder. The pistons are axially opposed from each other and independently generate electric current when each of the pistons linearly translate. Each of a pair of return members is disposed within a respective one of the outer chambers, and each of the return members is configured to return respective ones of the pistons to a respective first position from a respective second position after combustion.

BRIEF DESCRIPTION OF THE DRAWINGS

One or more embodiments will now be described, by way of example, with reference to the accompanying drawings, in which:

FIG. 2 illustrates the free piston linear alternator of FIG. 1 during a first stroke of the pistons driven outward by a combustion event from a first position toward a second position in accordance with the present disclosure; and FIG. 3 illustrates the free piston linear alternator of FIG. 1 during a second stroke of the pistons returned inward by a biasing force provided by respective return members toward a first position from a second position in accordance with the present disclosure.

DETAILED DESCRIPTION

Figure 1:
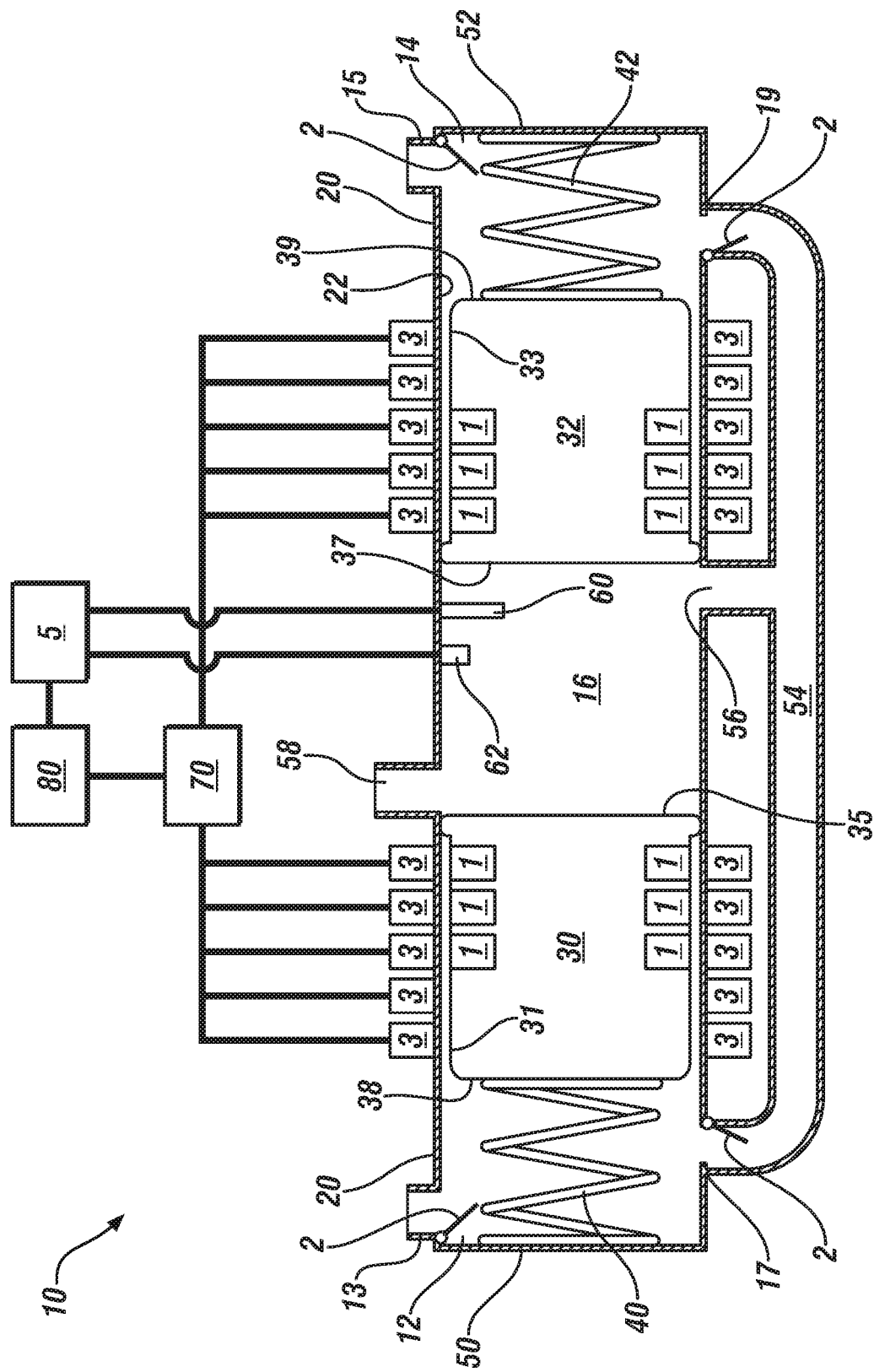
FIG. 1 illustrates a partial sectional view through an exemplary free piston linear alternator device utilizing opposed pistons with return members, in accordance with the present disclosure.

Referring now to the drawings, wherein the showings are for the purpose of illustrating certain exemplary embodiments only and not for the purpose of limiting the same, FIG. 1 illustrates a partial sectional view through an exemplary free piston linear alternator (FPLA) 10 that includes a cylinder 20 including first and second outer chambers 12,14, respectively, first and second opposed pistons 30,32, respectively, and a combustion chamber 16 disposed between the opposed pistons 30,32. Each of the outer chambers 12,14 are disposed between respective ones of the pistons 30,32 and a respective outer end 50,52 of the cylinder 20. The pistons 30,32 are axially opposed from each other and are configured to generate electric current when each of the pistons 30,32 linearly translate. First and second return members 40,42, respectively, are each disposed within respective ones of the outer chambers 12,14. The return members 40,42 are each configured to return each piston to a first position (e.g., inner dead center) from a second position (e.g., outer dead center) after a combustion event within the combustion chamber 16.

The combustion event within the combustion chamber 16 occurs in a two stroke cycle and said linear translation of each piston 30,32 includes a first stroke of each piston 30,32 from the first position to the second position driven by said combustion and a second stroke of each piston 30,32 from the second position to the first position in preparation for a subsequent combustion event. The second stroke utilizes stored energy within the return members 40,42 to force and return each respective piston 30,32 from the second position to the first position.

The return members 40,42 can be mechanical springs, pneumatic springs or hydraulic springs. However, the return members 40,42 are not limited to mechanical, pneumatic or hydraulic springs and can include any of several other spring-like devices that can be configured to store energy when compressed and utilize the stored energy to return and force each piston to the first position (e.g., inner dead center) from the second position (e.g., outer dead center) after a combustion event within the combustion chamber.

Referring to FIG. 2, each piston 30,32 translating towards the second position during the first stroke is illustrated in accordance with an exemplary embodiment of the present disclosure. The pistons 30,32 driven by a combustion event translate toward the second position. Each of the pistons is driven by a combustion driving force 200 resulting from the combustion event. The second position of each of the pistons 30,32 corresponds to an outer dead center position. During the first stroke, each of the return members 40,42 store energy due to the respective driven pistons compressing each respective return member 40,42. In other words, each of the return members 40,42 store energy via compression when each piston 30,32 translates from the first position to the second position driven by said combustion.

Referring to FIG. 3, each piston 30,32 translating towards the first position during the second stroke is illustrated in accordance with an exemplary embodiment of the present disclosure. The translation or piston return from the second position to the first position during the second stroke is achieved by a biasing force 300 provided by each of the return members 40,42. Each of the pistons 30,32 can be free pistons, therefore, each of the pistons is not connected to a crankshaft. The first position of each piston 30,32 can correspond to an inner dead center position (i.e., first position), where the inner dead center position is a natural resting position when no force is loaded upon the return members 40,42. During the second stroke, each of the return members 40,42 utilize the stored energy to apply the biasing force 300 to each respective piston 30,32, thereby forcing and returning the pistons 30,32 from the second position to the first position.

As illustrated in FIG. 1, each outer chamber 12,14 includes at least one respective inlet port 13,15 for receiving and channeling intake air into the respective outer chamber 12,14. Each inlet port can include a check valve 2 configured to allow intake air into each outer chamber. Specifically, the outer chambers 12,14 via the respective inlet ports 13,15 draw in the intake air when the pistons translate inward during the second stroke for eventual combustion within the combustion chamber 16. Hence, and with reference to FIG. 3, the outer chambers 12,14 receive drawn intake air 302 through a respective inlet port when each piston translates from the second position to the first position during the second stroke. The intake air can be charged with a turbocharger or a supercharger to increase the pressure of the intake air and provide a boost pressure to the engine, thereby increasing the output that can be achieved by the FPLA 10. Charged intake air can be cooled by a charge air cooler to increase the density of the air.

The action of the pistons provides for expulsion of exhaust gases and intake of charge air. The FPLA 10 configuration illustrated in FIG. 1 is a scavenging configuration where fresh intake air is drawn into scavenging chambers (e.g., outer chambers 12,14) to permit cooling of the pistons described herein, and then the air is subsequently drawn into the combustion chamber 16 as charge air.

The pistons 30,32 can be configured to compress the intake air within each respective outer chamber 12,14 when the pistons are driven outward during the first stroke by the combustion driving force 200, and thereby acting a supercharger device. Hence, and with reference to FIG. 1, each outer chamber 12,14 directs the drawn inlet air through a respective outlet port 17,19 for eventual combustion within the combustion chamber 16 when each piston 30,32 translates from the first position to the second position during the second stroke. The compressed intake air is directed or pumped through the respective outlet port 17,19 of each respective outer chamber 12,14 into a common intake manifold 54 for use during a subsequent combustion cycle. Specifically, each of the outer chambers compress the intake air through each of the respective outlet ports 17,19 into the common intake manifold 54 coupling each respective outlet port 17,19 to an inlet 56 of the combustion chamber 16 when each of the pistons 30,32 translate from the first position to the second position. The compressed intake air within the common intake manifold 54 is at a pressure higher than the pressure of the intake air within each of the outer chambers 12,14.

The FPLA 10 includes one or more fuel injectors 60. In an engine configured to operate through direct injection, a fuel injector 60 is supplied with high pressure fuel through a fuel rail or other device. In a direct injection engine, the fuel is sprayed directly into the combustion chamber 16. Other configurations are known wherein fuel can be injected into an intake port or ports and drawn into the combustion chamber 16 with the intake air. For instance, fuel could be injected at the combustion chamber inlet 56 or at some location within the common intake manifold 54. Fuel injectors are configured to spray or atomize the fuel in order to facilitate efficient mixing and combustion of the fuel within the combustion chamber 16.

As aforementioned the combustion chamber 16 includes one or more inlet ports 56. The combustion chamber 16 further includes one or more exhaust ports 58. Generally, intake ports channel charged air (e.g., intake air) by translating pistons to supercharge and compress intake air within each of the outer chambers 12,14, into the combustion chamber 16 via the common intake manifold 54. Exhaust ports receive exhaust from the combustion chamber 16 after a combustion event and channel the exhaust into an exhaust system, for example, through an exhaust manifold.

The combustion chamber 16 illustrated in FIG. 1 is defined by a wall 22 of the cylinder 20 and each of the opposed pistons 30,32. Specifically, a respective plug portion 35,37 on each respective piston 30,32 separates the combustion chamber 16 from the respective outer chamber 12,14. In other words, each of the plug portions 35,37 function as a sealing surface for combustion events within the combustion chamber 16. Intake air (e.g., charge air) is drawn into the combustion chamber 16 from the common intake manifold 54 at the end of the first stroke of the pistons 30,32 (i.e., FIG. 2). In an exemplary embodiment fuel is injected into the combustion chamber 16. Alternatively, fuel can be injected at the inlet port 56 or at a location within the common intake manifold 54. Subsequently, the fuel air charge is compressed by the returning of the pistons 30,32 provided by the biasing force 300 of each respective return member 40,42 (i.e., FIG. 3). The FPLA 10 is configured such that combustion occurs when the fuel air charge is compressed. In an exemplary embodiment of the present disclosure, leakage from either of the plug portions 35,37 can be scavenged into respective ones of the outer chambers 12,14 and subsequently drawn into the combustion chamber 16.

A number of combustion modes are known in the art, and the FPLA 10 is envisioned to utilize any number of combustion modes. The device can be configured to utilize diesel fuel for combustion. Combustion of diesel fuel can be controlled through compression ignition, where the fuel-air charge is compressed to a point wherein the charge ignites without a spark. Such configurations are known to additionally include a glow plug to assist in conditions wherein temperatures or other factors might make misfires or partial combustion of the charge possible. Additionally, diesel engines are known to utilize a premixed charge compression ignition mode (PCCI) including a high ratio of charge air to fuel or lean operation that can increase fuel economy of the engine. Alternatively, other fuels and engine configurations can be utilized including gasoline and ethanol blend fuels. As depicted in FIG. 1, such a configuration can include a spark plug 62 to provide spark at a particular timing to ignite the charge. Additionally, combustion modes are known including a stratified charge spark ignition mode and a homogeneous charge compression ignition (HCCI) mode. Stratified charge spark ignition mode can use a concentration of fuel within a particular portion of the combustion chamber 16 in combination with a timed spark from the spark plug to provide efficient combustion and force to the piston. HCCI mode includes operation with a high ratio of charge air to fuel or lean operation that can increase fuel economy of the engine. A number of fuels and combustion modes can be utilized within the engine. This disclosure is not intended to be limited to the particular exemplary embodiments provided herein.

An exhaust system receives exhaust gas from the exhaust port 58 or ports as an exhaust gas flow. The exhaust gas flow is characterized by an exhaust gas temperature, an exhaust gas pressure, and an exhaust gas mass flow rate. The exhaust gas flow can be directly expelled from the exhaust system to the ambient air. In another embodiment, an aftertreatment device or devices can be used to treat constituents that can be in the exhaust gas flow, including NOx, CO, and trace hydrocarbons. The exhaust gas flow can be additionally utilized in a turbomachine to transform pressure in the exhaust gas flow into mechanical energy.

As aforementioned, the pair of opposed pistons 30,32 generate electric current during each of the first and second strokes. The pistons 30,32 of the FPLA 10 includes a first element 1 interacting with a second element 3 located on the wall 22 of the cylinder 20 where translation of each piston between the first position and the second position generates the electric current. It will be understood that translation of each piston between the first position and the second position also includes translation between the second position and the first position generating the electric current. In an exemplary embodiment of the present disclosure, and as illustrated in FIG. 1, the first element includes a permanent magnet and the second element includes a winding. The windings include wires emanating from the windings in order to deliver the electric current to an associated rectifier 70. The rectifier 70 is electrically coupled to a battery 80 for storing the generated current. By placing the permanent magnets on the pistons 30,32, no wires need to be attached to the translating pistons. In an alternative embodiment, the first element 1 includes the winding and the second element 3 includes the permanent magnet. In other words, the first element of the FPLA 10 includes one of a permanent magnet and a winding, and the second element of the FPLA 10 includes the other one of the permanent magnet and the winding.

Heat is generated within the combustion chamber 16. Permanent magnets can be adversely affected by high temperatures. As a result, it can be beneficial to configure the piston such that the permanent magnets (i.e., first element 1) are not exposed to high temperatures. Such configuration can take a number of embodiments. For example, as illustrated in FIG. 1, the pistons 30,32 are located to interact with and compress the mass air flow of intake air being drawn into the outer chambers 12,14 of the FPLA 10. The aforementioned scavenging configuration can utilize the intake mass airflow into each of the outer chambers 12,14 to cool each respective piston 30,32 and the permanent magnets (i.e., first element) by the mass airflow through the outer chambers 12,14. Features upon the piston can be selected such that heat transfer from the piston to the intake air is maximized. In an exemplary embodiment of the present disclosure, a respective wall 31,33 of each piston 30,32 is thinned to maximize heat transfer from the first element 1 (e.g., permanent magnet). In another exemplary embodiment, each piston 30,32 is substantially hollow maximizing heat transfer from the first element 1 and reducing mass of each of the pistons 30,32. In another exemplary embodiment, heat transfer through each of the pistons 30,32 can be maximized or facilitated utilizing a series of fins coupled to respective outboard ends 38,39 of the respective cylinders 30,32 interacting with the drawn intake air within each of the outer chambers 12,14. The respective outboard ends 38,39 are adjacent to respective ones of the outer chambers 12,14 and respective outer ends 50,52 of the cylinder 20. Further, engine coolant or other fluids can be used in a heat exchanger design jacketed around the FPLA 10 for additional heat transfer away from the FPLA 10. Further, materials for the pistons can be selected to impact the heat transfer properties of each of the pistons 30,32. In an exemplary embodiment, steel can be utilized. In an alternative embodiment, aluminum can be utilized. In another alternative embodiment, a ceramic material can be utilized that reduces the amount of heat that is transferred from the combustion chamber 16 to the first element 1 (e.g., permanent magnets). It will be understood that a number of different materials can be utilized, and the disclosure is not intended to be limited to the particular exemplary embodiments disclosed herein.

Free piston engines do not include high magnitude lateral forces within the combustion chamber 16 as when a piston is connected to a crankshaft. As a result, certain embodiments of piston designs can be utilized that do not require seals or piston rings between the pistons 30,32 and the cylinder wall 22. Such embodiments additionally reduce the heat generated within the device and can reduce the temperatures experienced by the permanent magnets.

Piston mass can affect operation of the FPLA 10. For instance, the combustion force 200 required to drive each of the pistons 30,32 and oscillation frequencies within the pistons 30,32 are affected by piston mass. Likewise, the biasing force 300 required to return each piston to inner dead center (e.g., the first position) is affected by piston mass.

As aforementioned, the electric current generated within the device is created within the windings (i.e., second element 3) illustrated in FIG. 1. The wires illustrated in FIG. 1 transmit the electric current to the rectifier 70. The electric current generated within the FPLA 10 is generated as an alternating current. The rectifier 70 can be utilized to transform the electric current from alternating current to direct current and thereby stored as energy within the battery 80.

When a combustion event drives each of the pistons 30,32 to the outer dead center position (i.e., second position), respective ones of the return members 40,42 are compressed between respective ones of the outboard ends 38,39 of the pistons and respective ones of the outer ends 50,52 of the cylinder 20. In an exemplary embodiment of the present disclosure, each of the return members 40,42 can be mechanically coupled to respective ones of the outboard ends 38,39 of each respective piston 30,32. In another exemplary embodiment of the present disclosure, each of the return members 40,42 can be mechanically coupled to respective ones of the outer ends 50,52 of the cylinder 20. Hence, each of the return members 40,42 can be mechanically coupled to one of respective ones of the outboard ends 38,39 of each respective piston 30,32 and respective ones of the outer ends 50, 52 of the cylinder. In an alternative embodiment of the present disclosure, each of the return members 40,42 can be freely disposed within respective ones of the outer chambers 12, 14 and therefore not mechanically coupled to any feature within the cylinder.

In an exemplary embodiment of the present disclosure, the compression ratio within the combustion chamber 16 can be affected by modulating the biasing force 300 provided by the return members 40,42. In an exemplary embodiment of the present disclosure, the biasing force 300 provided by the return members 40,42 can be modulated by adjusting the spring constant of at least one of the return members 40,42. In another exemplary embodiment, the biasing force 300 can be modulated by one of lengthening and shortening a distance from the center of the combustion chamber 16 to each of the outer ends 50,52 of the cylinder 20. The one of lengthening and shortening the distance can be provided by axially adjusting the outer ends 50,52 of the cylinder utilizing at least one of a number of methods including, but not limited to, hydraulic actuation, pneumatic actuation and electric actuation.

A control module 5 or modules are utilized to control various portions of the device. A control module 5 can control a fuel flow rate into the combustion chamber 16, affecting the output of the device. A control module 5 can increase or decrease electrical resistance applied to the electric circuit, thereby affecting how much current is drawn from the device. Such a modulation of the current drawn from the device can affect the electric power that is delivered to the rectifier 70. Further, modulation of the current drawn from the device can modulate the force created by induction upon the pistons 30,32, thereby affecting the cycling of the pistons 30,32 and combustion within the combustion chamber 16. For example, the combustion force 200 and the biasing force 300 applied to the pistons can affect the compression ratio within the combustion chamber 16.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

The FPLA 10 as described herein can be utilized singly in an exemplary embodiment of the present disclosure. In an alternative embodiment, FPLAs can be utilized in pairs or in banks. Depending upon the overall requirements of the entire configuration, individual devices or groups of devices can be selectively activated or deactivated. Each device can be individually balanced, with opposing pistons operating in equal and opposite translations, so configurations can be utilized that do not require operation of the devices to be maintained in pairs.

The FPLA 10 includes fewer moving parts than other conventional engine configurations. Further, as described herein, a configuration can be utilized not requiring pistons rings. As a result of fewer moving parts and the elimination of piston rings, heat generation in the device is reduced and engine efficiency is increased.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A free piston linear alternator comprising:
   a cylinder including a pair of outer chambers, a pair of opposed pistons and a combustion chamber disposed between the opposed pistons, each piston including a respective first end adjacent to the combustion chamber and a respective second end opposite to the combustion chamber and adjacent to respective ones of the outer chambers;
   each of the outer chambers defined by
      a wall of the cylinder,
      the respective second end of adjacent ones of the pistons, and
      a respective outer end of the cylinder;
   the pistons axially opposed from each other and independently generating electric current when each of the pistons linearly translate;
   a pair of return members, each return member disposed within a respective one of the outer chambers between the respective second end of adjacent ones of the pistons and the respective outer end of the cylinder, each of the return members configured to
      store energy when compressed between adjacent ones of the pistons and the respective outer end of the cylinder when each of the pistons linearly translate from a respective first position to a respective second position away from the combustion chamber after combustion, and
      utilize the stored energy to return adjacent ones of the pistons from the respective second position to the respective first position toward the combustion chamber; and
   each of the outer chambers including:
      a respective inlet port for drawing intake air when the corresponding piston linear translates from the respective second position to the respective first position toward the combustion chamber, and
      a respective outlet port for directing the drawn intake air into a common intake manifold coupling each respective outlet port to an inlet of the combustion chamber when the corresponding piston translates from the first position to the second position away from the combustion chamber.

2. The free piston linear alternator of claim 1 wherein said combustion occurs in a two stroke cycle and said linear translation of each piston comprises a first stroke of each piston from the respective first position to the respective second position driven by said combustion and a second stroke of each piston from the respective second position to the respective first position.

3. The free piston linear alternator of claim 2 wherein the respective first position corresponds to the corresponding piston in a respective inner dead center position and said respective second position corresponds to the corresponding piston in a respective outer dead center position.

4. The free piston linear alternator of claim 1 wherein each of the pistons is a free piston having a natural resting position comprising the first position when no force is loaded upon the return members.

5. The free piston linear alternator of claim 1 wherein each piston includes a respective first element of the linear alternator interacting with a respective second element of the linear alternator located on a wall of the cylinder where translation of each piston between the respective first position and the respective second position generates the electric current.

6. The free piston linear alternator of claim 5 wherein the first elements comprise one of permanent magnets and windings, and the second elements comprise the other one of permanent magnets and the windings.

7. The free piston linear alternator of claim 1 wherein each of the return members is mechanically coupled to one of the corresponding adjacent piston and the corresponding outer ends of the cylinder.

8. The free piston linear alternator of claim 1 wherein each of the return members is freely disposed within a corresponding outer chamber.

9. The free piston linear alternator of claim 1 wherein each piston is substantially hollow having a respective plug portion separating the combustion chamber from the respective outer chamber.

10. The free piston linear alternator of claim 1 wherein each piston comprises a respective plurality of fins exposed to the intake air drawn in through each respective inlet of each respective outer chamber.

11. The free piston linear alternator of claim 1 wherein each respective outlet expels the drawn intake air into a common intake manifold.

12. The free piston linear alternator of claim 1 wherein a respective biasing force created by each of the return members and applied to force the pistons from the second position to the first position is controlled to effect a desired compression ratio within the combustion chamber.

13. Method for controlling a free piston linear alternator having a cylinder including a pair of outer chambers, a pair of opposed pistons and a combustion chamber disposed between the opposed pistons comprising:
   subsequent to a combustion event within the combustion chamber, driving each piston outward from a respective inner dead center position to a respective outer dead center position away from the combustion chamber, each piston including a respective first end adjacent to the combustion chamber and a respective second end opposite to the combustion chamber and adjacent to respective ones of the outer chambers, wherein each of the outer chambers is defined by a wall of the cylinder, the respective second end of the adjacent ones of the pistons, and a respective outer end of the cylinder; and
   utilizing a respective biasing force provided by respective return members each disposed within respective ones of the outer chambers between the respective second end of adjacent ones of the pistons and the respective outer end of the cylinder, the respective biasing force provided by the respective return members when compressed between adjacent ones of the pistons and the respective outer end of the pistons to return each respective piston inward from the respective outer dead center position to the respective inner dead center position toward the combustion chamber in preparation for a subsequent combustion event, wherein each of the outer chambers includes:
      a respective inlet port for drawing intake air when the corresponding piston returns inward from the respective outer dead center position to the respective inner dead center position toward the combustion chamber, and
      a respective outlet port for directing the drawn intake air into a common intake manifold coupling each respective outlet port to an inlet of the combustion chamber when the corresponding piston is driven from the respective inner dead center position toward to the outer dead center position away from the combustion chamber.

14. The method of claim 13 wherein the respective biasing forces are modulated to effect a desired compression ratio within the combustion chamber.

15. The method of claim 13 wherein each piston comprises one of a permanent magnet and a winding interacting with the other one of the permanent magnet and the winding located on the wall of the cylinder where translation of each piston between the respective inner dead center position and the respective outer dead center position generates electric current.

16. A free piston linear alternator, comprising:
   a cylinder having closed opposite ends;
   a respective electrical winding surrounding said cylinder adjacent to each opposite end;
   a pair of pistons slidably disposed within said cylinder, each piston including a respective permanent magnet and including a respective first end adjacent to a variable volume chamber and a respective second end opposite to the variable volume chamber and adjacent to respective ones variable volume outer chambers;
   the respective variable volume outer chamber within said cylinder defined by a wall of the cylinder,
      the respective second end of adjacent ones of the pistons, and
      a respective closed opposite end of said cylinder;
   a respective return spring corresponding to each piston and urging the respective piston away from the respective opposite end of said cylinder subsequent to a combustion event with the variable volume combustion chamber, each return member disposed within a respective one of the variable volume outer chambers between the respective second end of adjacent ones of the pistons and the respective closed opposite end of the cylinder;
   a respective first check valve corresponding to each variable volume outer chamber effective to allow an intake air draw into the respective variable volume outer chamber through a respective inlet port when the corresponding piston moves away from the respective opposite end;
   a respective second check valve corresponding to each variable volume outer chamber effective to allow expulsion of the intake air from within the respective variable volume outer chamber through a respective outlet port when the corresponding piston moves toward the respective opposite end; and
   a common intake manifold coupling each respective outlet port to an inlet of the combustion chamber, said common intake manifold directing the intake air that is expelled from each variable volume outer chamber to the inlet of the combustion chamber.

* * * * *